(12) United States Patent
Golovkova et al.

(10) Patent No.: US 8,106,120 B2
(45) Date of Patent: Jan. 31, 2012

(54) EASILY REMOVABLE CONCRETE CURING COMPOUND

(75) Inventors: Tatiana Anatolievna Golovkova, Lakewood, OH (US); Thomas Wayne Richardson, Aurora, OH (US)

(73) Assignee: The Euclid Chemical Company, Cleveland, OH (US)

( * ) Notice: Subject to any disclaimer, the term of this patent is extended or adjusted under 35 U.S.C. 154(b) by 560 days.

(21) Appl. No.: 12/203,564

(22) Filed: Sep. 3, 2008

(65) Prior Publication Data

US 2009/0162540 A1 Jun. 25, 2009

Related U.S. Application Data

(60) Provisional application No. 61/016,255, filed on Dec. 21, 2007.

(51) Int. Cl.
*C08K 3/20* (2006.01)

(52) U.S. Cl. .................................. 524/516; 524/457

(58) Field of Classification Search .................. 524/516, 524/457
See application file for complete search history.

(56) References Cited

U.S. PATENT DOCUMENTS

| | | | |
|---|---|---|---|
| 3,676,198 A | 7/1972 | McGroarty | |
| 4,076,661 A * | 2/1978 | Kassner | 524/45 |
| 4,336,171 A * | 6/1982 | Kohlstadt et al. | 524/510 |
| 4,374,948 A * | 2/1983 | Adams et al. | 524/516 |
| 4,455,331 A * | 6/1984 | Barsotti | 428/446 |
| 5,360,847 A | 11/1994 | Dewacker et al. | |
| 2006/0100341 A1 | 5/2006 | Mosquet | |
| 2006/0154096 A1 | 7/2006 | Joubert | |

FOREIGN PATENT DOCUMENTS

| | | |
|---|---|---|
| AU | 441841 | 10/1973 |
| CN | 1453244 | 11/2003 |
| EP | 0024602 | * 3/1981 |
| EP | 1260553 | 11/2002 |
| JP | 2005162534 | 6/2005 |
| WO | 9623937 | 8/1996 |

OTHER PUBLICATIONS

Haas, F., et al., "Polymers of N-Vinylpyrrolidone: Synthesis, Characterization and Uses" Polymer Jounal, vol. 17, No. 1, 1985, pp. 143-152.

International Search Report and Written Opinion from International Application No. PCT/US2008/080670, mailed Feb. 19, 2009.

* cited by examiner

*Primary Examiner* — Bernard Lipman

(74) *Attorney, Agent, or Firm* — Calfee, Halter & Griswold, LLP

(57) ABSTRACT

An aqueous based concrete curing compound is made easily removable by including in the composition polyvinylpyrrolidone or other water-soluble, readily redissolvable, film-forming polymer resin.

19 Claims, No Drawings

EASILY REMOVABLE CONCRETE CURING COMPOUND

BACKGROUND AND SUMMARY

"Concrete curing compounds" are commonly applied to freshly poured concrete to retard evaporation of water, thereby enhancing the concrete's compressive strength and other key physical characteristics once cured. U.S. Pat. No. 5,360,847, the disclosure of which is incorporated herein by reference, describes a concrete curing compound comprising an aqueous emulsion of a styrene and/or acrylic polymer to which a polysaccharide has been added to male the barrier film produced by the emulsion removable. Although this patent indicates these barrier films can be removed by abrasion in the presence of water only, the detailed description shows that, as a practical matter, an enzyme for the polysaccharide must be included not only in the coating composition itself but also in the wash water used for the removal process.

SUMMARY

In accordance with this invention, an aqueous based concrete curing compound is made easily removable by including in the composition a water-soluble, readily redissolvable, film-forming polymer such as polyvinylpyrrolidone or the like.

Thus, this invention provides an easily removable concrete curing compound comprising water, an emulsifiable hydrophobic membrane-forming polymer and a water-soluble polymer which is readily redissolvable, film forming and has a water solubility of at least 100 gms/liter.

In addition, this invention further provides a process for forming an easily removable concrete curing compound comprising combining a water-soluble, readily redissolvable, film-forming polymer having a water solubility of at least 100 gms/liter with water and an emulsifiable hydrophobic membrane-forming polymer.

In addition, this invention further provides a process for retarding premature evaporation of water from freshly poured concrete comprising applying to the freshly poured concrete a concrete curing coating composition comprising water, an emulsifiable hydrophobic membrane-forming polymer and a water-soluble, readily redissolvable, film-forming polymer having a water solubility of at least 100 gms/liter, and thereafter allowing the coating composition to dry thereby forming an easily removable barrier film having moisture retention properties complying with ASTM C 309.

DETAILED DESCRIPTION

In accordance with this invention, an aqueous based concrete curing composition is made easily removable by including in the composition a water-soluble, readily redissolvable, film film-forming polymer such as polyvinylpyrrolidone or the like.

Conventional Aqueous Based Concrete Curing Compounds

Compositions which are applied to freshly poured concrete for preventing premature evaporation of water are referred to in industry as "concrete curing compounds," even though they are clearly not true "compounds," by definition, since they contain multiple ingredients. Accordingly, in this disclosure, the conventional terminology of "concrete curing compounds" is used to refer to prior art compositions of this type, while "concrete curing composition" or just "composition" is used to refer to the inventive compositions to make clear that they are mixtures of ingredients and not true compounds. In terms of industry-used terminology, however, the inventive compositions are also "concrete curing compounds" in the sense of ASTM C 309, further discussed below.

In order to qualify as a "concrete curing compound" in the United States, a composition must meet the requirements of ASTM C 309, "Standard Specification for Liquid Membrane-Forming Compounds for Curing Concrete," which is a measure of the ability of the barrier film formed by the composition when dried to retain moisture in the concrete substrate to which it is applied. Currently available ("conventional") concrete curing compounds are very difficult to remove when cure of the concrete is essentially complete, which typically occurs within 7-10 days of pouring. Abrasive grit, shot, sand blasting and/or aggressive abrasion with multiple passes of a professional floor cleaning machine equipped with a highly aggressive abrasive pad is normally required, usually in combination with aggressive chemical cleaners and/or acidic stripping solutions.

Aqueous based concrete curing compounds typically comprise an aqueous emulsion of a hydrophobic polymer which is capable of forming a coherent, water-impermeable membrane when the emulsion is applied to a concrete substrate and dried, hereinafter a "hydrophobic membrane-forming polymer." Alternatively, such concrete curing compounds may also comprise an emulsion or latex in which the hydrophobic membrane-forming polymer is dissolved and/or dispersed in an organic solvent, with the solution/dispersion so obtained being emulsified or dispersed in water.

Many different organic polymers have been used as the hydrophobic membrane-forming polymer in conventional concrete curing compounds. Examples include chlorinated rubbers, styrene copolymers, acrylic copolymers, hydrocarbon resins, paraffin waxes, and the like. All such hydrophobic membrane-forming polymers which have previously been used to formulate concrete curing compounds, as well as all hydrophobic membrane-forming polymer which maybe used in the future to formulate concrete curing compounds, can be used to make the easily removable concrete curing coating compositions of this invention.

In addition to the hydrophobic membrane-forming polymer, conventional aqueous based concrete curing compounds also typically contain various other ingredients such as organic solvents for suspending and/or dissolving the polymer resin, coalescing agents, plasticizers, defoaming agents, biocides, antimicrobial agents, emulsifying agents, pigments such as titanium dioxide, zinc oxide pigments, and the like. See, for example, the above-noted U.S. Pat. No. 5,360,847. All such additional ingredients which have previously been used to formulate concrete curing compounds, or which may be used in the future to formulate concrete curing compounds, in the concentrations in which they have or will be used, can be used to make the easily removable concrete curing coating compositions of this invention.

Water-Soluble Polymer

In accordance with this invention, an aqueous based concrete curing composition is made easily removable by including in the composition a water-soluble polymer such as polyvinylpyrrolidone or the like which is both film-forming and easily removable. Normally, this water-soluble polymer will have solubility in water of at least about 100 gms/liter. Water-soluble polymer with water solubilities of at least about 200 gms/liter, at least about 250 gms/liter, at least about 300 gms/liter, at least about 400 gms/liter, or even at least about 500 gms/liter, are more interesting.

In addition to being water-soluble, these polymer resins are also "film-forming" as well as "readily redissolvable." By "film-forming" is meant that an aqueous solution of the polymer, when deposited on an impervious substrate and dried, will produce a coherent film of the polymer. By "readily redissolvable" is meant that the polymer, when in the form of such a coherent film, readily dissolves in water. Thus, these polymers differ from the water-soluble, enzyme susceptible polysaccharides of U.S. Pat. No. 5,360,847 which, after being formed into a film or a component of a film, must be chemically degraded such as by enzymes or the like before they can redissolve.

To determine if a particular water-soluble film-forming polymer is readily redissolvable, a simple test can be carried out in which a film of the polymer formed on an impervious substrate is immersed in standing water having a neutral pH (pH of 5-9) for up to 30 minutes. If the film dissolves and is capable of forming a solution with the same chemical and physical properties as before allowing to dry into the film, it is "readily redissolvable" in the context of this invention. In contrast, if portions of the film remains firmly adhered to the substrate such that it can only be removed with significant scrapping or similar abrasion, or flakes off the substrate, it is not "readily redissolvable" in the context of this invention.

Essentially any water-soluble polymer which is readily redissolvable and film-forming at application temperatures can be used for the purposes of this invention. Those which are free or essentially free of polymerized saccharide units are especially interesting. As well understood in the art, concrete curing compounds are commonly applied at temperatures as low as −4° C. Therefore, the water-soluble polymers used in this invention desirably are readily redissolvable and film-forming at temperatures as low as −4° C., at least in some embodiments.

Water-soluble polymers which are "non-thickening" are also of special interest. In this context, a "non-thickening" water-soluble polymer is one which provides an aqueous solution whose viscosity does not substantially increase on heating. Non-thickening polymers are desirable where higher use temperatures (e.g. 80-100° F. or more) may be encountered, since this avoids problems that may occur when "thickening" type polymers are used such as coagulation of previously prepared compositions and clumping of the water-soluble polymer when new compositions are prepared.

Specific examples of suitable water-soluble polymer that can be used in this invention include polyvinylpyrrolidone, polyvinyl alcohol, polyacrylic acid, polymethacrylic acid, polyethers, polyethylene glycols, polyacrylamides, polymethacrylamides, polyetheroxides, polyvinylimidazole, and the like. Copolymers containing at least 50 mol % of these copolymerized monomers, i.e., at least 50% of one or more of vinylpyrrolidone, vinyl alcohol, acrylic acid, methacrylic acid, ethers, ethylene glycol, acrylamide, methacrylamide, vinyl imidazole can also be used. Such copolymers which are extended with ethylene oxide and/or propylene oxide and/or capped with ethylene oxide can also be used.

The molecular weight of the water-soluble polymer that can be used in this invention can vary widely, and essentially any molecular weight can be used so long as the desired performance requirements of the compositions obtained therefrom are retained. In this regard, it has been found in accordance with this invention that, in the barrier membranes produced by the inventive compositions, there is a trade off between moisture retention properties, on the one hand, and ease of removability properties, on the other hand. In addition, it has been further found that this trade off is affected by the molecular weight of the particular water-soluble polymer used as well as its concentration. Moreover, the choice of the molecular weight and concentration of the water-soluble polymer used in particular embodiments of the invention may also be affected by the particular method of placement being used or other placement criteria.

Generally speaking, this means that molecular weight of the water-soluble polymer will normally be at least about 100,000 and may be as high as 10,000,000 or even more. More typically, the molecular weight will be between about 100,000 and 2,500,000, with molecular weights on the order of 150,000-2,000,000 being more interesting.

The amount of water-soluble polymer that can be included in particular embodiments of the inventive composition should be selected to achieve the desired performance requirements of composition obtained. As indicated above, it has been found in accordance with this invention that there is a trade off between moisture retention ability and ease of remove-ability in connection with the barrier membranes produced by the inventive compositions and further that this trade off is affected by the concentration of the water soluble polymer in the composition, among other variables. Thus, the concentration of water-soluble polymer should be selected to achieve a desired balance between these different properties. Normally, this means that the concentration of water-soluble polymer in the inventive concrete curing compounds will be between about 2-20 wt. %, based on the total weight of polymer solids (i.e., the total amount of water-soluble polymer plus hydrophobic membrane-forming polymer) in the composition. Concentrations of about 3-10 wt. %, about 4-6 wt. %, and even about 4-5 wt. %, are more interesting.

So, for example, a water-soluble film-forming polymer of appropriate molecular weight, when used in the correct amount, will produce a barrier membrane which exhibits the necessary moisture retention properties as well as the necessary easy removability properties. In contrast, if the molecular weight of the water-soluble polymer resin used is too low, and/or if the amount of the water-soluble polymer used in a particular composition is too little, then the barrier membrane produced will not be easily removable. Similarly, if the molecular weight of the water-soluble polymer used is too high, and/or if the amount of the water-soluble polymer used in a particular composition is too much, then the composition will not exhibit the necessary moisture retention properties or will not be easily placeable using conventional application methods.

The inventive concrete curing compositions desirably meet the industry recognized standard for moisture retention properties, as set forth in ASTM C 309, "Standard Specification for Liquid Membrane-Forming Compounds for Curing Concrete." In addition, they are also "easily removable," which means that a barrier film made by such a composition can be readily removed by moderate abrasion as determined by the following test, which can also be used as initial screening tool to select the most suitable composition. A 6-mil-thick drawdown is applied onto an impervious substrate, such as an aluminum or other metal panel; the formed film is allowed to dry for 7-10 days to ensure complete evaporation of the volatile matter in the composition. While drying, the samples are kept in the dark in order to avoid potential degradation of the film due to UV light. After that, a few drops of water (or the aqueous wash solution intended for use in removing the barrier film, as farther discussed below) are placed onto the dried film. At the end of 10 minutes, and at 10-minute intervals until failure, the film is tested with a cotton swab. The film is considered to fail (i.e., to be removable) when it can be easily disintegrated with a cotton swab to which a light manual pressure is applied. Barrier films that are removable within 30 minutes are considered to be "easily removable."

Application and Removal

The inventive concrete curing composition is applied to a concrete substrate in the same way as conventional concrete curing compounds, e.g., by depositing a quantity of the curing composition on the substrate, spreading the composition at the appropriate wet film thickness and allowing the liquid film to dry into a coherent barrier film. This is can be achieved by paint roller or squeegee but is more commonly spray applied with manually or mechanically pressurized equipment dependant on the area size.

As for removal, a barrier film formed from the inventive concrete curing composition can be removed following the general procedure described above, i.e., by (1) by subjecting the barrier film to moderate abrasion when in contact with wash water preferably containing some form of emulsifier such as a detergent or soap, (2) optionally allowing the washed and abraded film to soften while desirably keeping the surface wet, and then (3) moderately abrading the softened film a second time. If desired, the softened film can be contacted with additional wash water during this second abrading step, this additional wash water either containing or not containing a soap, detergent or other emulsifier, as desired. Moreover, additional washing and/or rinsing steps may also be performed, if desired, although they are generally unnecessary.

As indicated above, the initial abrading step is generally done in the presence of water, with enough water being used to thoroughly wet the film. A soap, detergent or other emulsifier may be included in this wash water, as this has been found to make removal easier, at least in some instances. Any soap, detergent or other emulsifier/surface active agent can be used for this purpose. One example is Smok-Solv Liquid Wall Wash available from Chemical Specialties Manufacturing Corporation, 901 North Newkirk Street, Baltimore, Md. 21205, which is believed to be an aqueous blend of sodium orthosilicate, 2-butoxyethanol, and alcohol ethoxylates. Another example is Ecolution Pro Cleaner Degreaser, which is believed to be an aqueous mixture of ethoxylated alcohols, sodium gluconate and alkyl polyglycoside, supplied by State Chemical Solutions located at 3100 Hamilton Avenue, Cleveland, Ohio 44114.

In the optional second step of the removal process, the washed and abraded film is allowed to soften. This is normally done by allowing the film dwell or to sit undisturbed for a suitable period of time, although additional manipulation of the film, physically or chemically, can be carried out if desired. During this dwelling phase, the water-soluble polymer absorbs water, begins to swell, increases in volume, nears saturation, and thus, the physical integrity of the film deteriorates in the sense that the film becomes weaker, the bond strength of the film to its concrete substrate weakens, or both. This softening effect may occur in as little as one minute or less, but more typically requires two minutes or more, more commonly about 10 minutes or more, due at least in part to excessive application of the concrete curing composition, uneven application, poor coverage, and concrete slab topography.

Theoretically, there is no maximum amount of time for the softening step, as the washed and abraded film inherently becomes weaker as a result of the abrasion it receives during the first abrasion step, which in turn allows and facilitates the wash water to contact the water-soluble polymer quicker. As a practical matter, however, it is desirable to end the softening step before complete evaporation of all of the wash water used in the first abrasion step, as this prevents the water-soluble polymer from rehardening. Thus, the second abrading step is desirably done within an hour of the first abrading step, more commonly within 30-45 minutes of the first abrading step, and more typically between 15-20 minutes of the first abrading step.

The softening time depends, among other things, on the identity and amount of the particular water-soluble polymer used, the identity and amount of the detergent, soap or emulsifier used in the wash water of the first abrasion step, if any, and can easily be determined by routine experimentation. Normally, it is between 5 minutes and 5 hours, although softening times on the order of 10 minutes to 2 hours are more typical.

In the third step of the removal process described above, the softened barrier film is moderately abraded again. As a result, the physical integrity of the softened barrier film is destroyed and the bond between the disintegrated barrier film and the surfaces of the concrete substrate broken. Any disintegrated film not taken up by abrasive pad of the floor cleaning machine can be easily removed by additional passes with successive abrasive grit pads mounted on the appropriate commercial floor cleaning machine, pressure washing with clean water, simply spraying with water from a garden hose, or the like.

An other approach that can be used to remove the barrier film formed from the inventive concrete curing composition involves the following the general procedure: (1) applying an aqueous cleaning solution onto the barrier film, (2) allowing the aqueous cleaning solution to dwell for up to 15 minutes, (3) subjecting the barrier film to moderate abrasion with or without additional water or aqueous cleaning solution, (4) allowing the softened barrier film to dwell, (5) subjecting the barrier film to a second moderate abrasion followed by elimination or removal of the aqueous cleaning solution/barrier film mixture (5) fresh water flush with or without light to moderate abrasion.

As discussed above, an important feature of this invention is that removal of the barrier film formed by the inventive concrete curing agent is easier than possible with conventional concrete curing compounds, at least in the time frame in issue here, about 7-10 days after application. In practice, abrasion of barrier films made from concrete curing compounds is almost always done using commercial floor cleaning machines which rotate and slide a suitable abrasion pad mounted on a rotating platen of the machine across the section of the concrete floor being treated. The severity of abrasion depends on the structure of the abrasion pad, the pressure exerted on abrasion pad from the weight of the cleaning machine on the platen, the speed of rotation, and the contact time for the abrasion step. In conventional practice, this abrasion is commonly augmented with harsh corrosive and or toxic chemical strippers and cleaners that degrade, etch, digest, and or attack the barrier film along with the surface of the concrete slab.

As known throughout the industry, some barrier films can only be removed with extremely severe abrasion such as by sand blasting. Severe abrasion can also be provided by commercial floor cleaning machines using extremely abrasive pads, very high abrasion pressures, long abrasion times, harsh corrosive chemical strippers and cleaners or combinations thereof. In this invention, however, such severe abrasion is unnecessary, since the barrier films provided by the inventive concrete curing compositions are easily removable with light to moderate abrasion normally with mild eco-friendly soaps or detergents. Thus, the barrier films produced from the inventive concrete curing compositions can normally be removed by the three step removal process discussed above when using light to moderate abrasion such as that provided by conventional commercial floor cleaning machines using abrasion pads having moderate abrasion characteristics and operated for relatively short periods of time. For example, the abrasion provided by a Model RGS-50 or GPS33 industrial floor cleaning machine available from Draygon Enterprises, Inc. of 46 Commercial Street, Webster, N.Y., 14580, or Model 7760 industrial floor cleaning machine available from American Lincoln of 1100 Haskins Road, Bowling Green, Ohio 43402, when equipped with a blue or green medium duty high porosity wet scrubbing pad for a total abrasion time per unit area of concrete floor of no more than 10 seconds provides the type of moderate abrasion which is effective to remove a barrier film produced by the inventive compositions when using the three step removal process described above.

EXAMPLES

In order to more thoroughly describe this invention, the following working examples are provided.

Each concrete curing composition was formed by adding a water-soluble, easily removable, film-forming polymer to a conventional aqueous based concrete curing compound, namely, Kurez DR VOX, available from The Euclid Chemical Company of Cleveland, Ohio, which is composed of a solution of hydrocarbon resin (NJ TSRN# 51721300-5490P) dissolved in Stoddard Solvent (mineral spirits) dispersed in >60 wt. % water. The amount of water-soluble polymer added to each composition was 2-10% by weight, based on the total weight of polymer in the composition. In some instances, the water-soluble polymer was pre-dissolved in deionized water before the addition to ensure it is thoroughly blended with the hydrocarbon emulsion. In other instances, the water-soluble polymer was added as a powder. Thereafter, malke-up water was added to some of the compositions so that the total polymer content of each concrete curing compound produced was 20 wt. %.

The moisture retention properties of the barrier membranes produced by each new concrete curing compound was then determined according to ASTM C 309, "Standard Specification for Liquid Membrane-Forming Compounds for Curing Concrete." In addition, each concrete curing compound was applied to a separate 12"×12" slab that had been previously placed using generally accepted good concreting practices, finished and possibly burnished with a steel trowel, and the barrier film formed thereby then allowed to sit for at least 7 days. The ease of removing each barrier film was then determined by a three step removal process comprising (1) abrading the barrier film using a standard 15" floor machine equipped with a high porosity fiber wet medium duty scrubbing pad for 10 seconds, the barrier film having been flooded with a wash water containing 4 parts by weight water and 1 part by weight Smoke-Solv Liquid Wall Wash available from Chemical Specialties Manufacturing Corporation, (2) allowing the abraded barrier film to soften for 10-15 minutes, and then (3) abrading the softened barrier film a second time with same equipment and for the same time as the first abrasion step but without any additional wash water or other liquid being used. A barrier film which was removed essentially completely by this procedure, as determined by visual inspection, was regarded as a pass. That is, a barrier film in which essentially no portion of the barrier film remained firmly bonded to the concrete substrate was regarded as a pass. A barrier film not removed essentially completely was regarded as a fail.

Four different polyvinylpyrrolidone polymers and copolymers were used. The compositions, molecular weights and water solubilities of these polymers are set forth in the following Table 1:

TABLE 1

Composition and Properties of Polymers

| Name | Composition | Molecular weight | Solubility in water |
|---|---|---|---|
| PVP, K-30 | polyvinylpyrrolidone, K-value range 26-35 | 66,800 gpc/malls | highly soluble |
| PVP, K-90 | polyvinylpyrrolidone, K-value range 88-100 | 1,570,000 gpc/malls | >270 g/L |
| PVP/VA | copolymer of vinylpyrrolidone and vinyl acetate (60/40) | 55,000 gpc/malls | 300 g/L |
| PVP/MA/IA | copolymer of vinylpyrrolidone, methacrylamide and vinyl imidazole | 270,000 gpc/malls | highly soluble |

The results obtained are set forth in the following Table 2 in which "Removal" refers to whether or not the barrier film was easily removable according to the test method described above, while "Curing" refers to whether or not the barrier film passed ASTM C 309:

TABLE 2

Results

| | Concentration, % based on total solids content | | | | | | | |
|---|---|---|---|---|---|---|---|---|
| | 10 | | 5 | | 4 | | 2 | |
| Polymer | Removal | Curing | Removal | Curing | Removal | Curing | Removal | Curing |
| PVP, K-30 | fail | not done | Fail | fail | not done | not done | not done | not done |
| PVP, K-90 | pass | fail | Pass | pass | pass | pass | fail | pass |

TABLE 2-continued

Results

| Polymer | Concentration, % based on total solids content | | | | | | | |
|---|---|---|---|---|---|---|---|---|
| | 10 | | 5 | | 4 | | 2 | |
| | Removal | Curing | Removal | Curing | Removal | Curing | Removal | Curing |
| PVP/VA | fail | not done | fail | not done | not done | not done | not done | not done |
| PVP/MA/IA | pass | fail | Pass | pass | pass | pass | fail | pass | several tests were "not done" due to the failure of removability at higher concentrations of the water-soluble polymer.

From the above, it can be seen that two of the indicated polymers, PVP K-90 and PVP/MA/IA, produced barrier films which were both easily removable and met the requirements of ASTM C 309, even though they had significantly different molecular weights and water solubilities, but only if present in the concrete curing compounds in suitable amounts. However, when these same polymers were used in concentrations that were too low, the barrier films obtained were not easily removable. Similarly, when these polymers were used in concentrations that were too high, the barrier films obtained could not meet the moisture retention requirements of ASTM C 309.

The above results further show that the polymers having molecular weights which are too low, PVP K-30 (MW=66,800) and PVP/VA (MW=55,000), formed barrier films which were not easily removable even if used in significant amount.

Although only a few embodiments of the present invention have been described above, it should be appreciated that many modifications can be made without departing from the spirit and scope of the invention. All such modifications are intended to be included within the scope of the present invention, which is to be limited only by the following claims:

The invention claimed is:

1. An easily removable concrete curing coating composition comprising:
    an aqueous emulsion comprising a hydrophobic membrane-forming polymer resin dissolved in an organic solvent and emulsified in water; and
    a water-soluble polymer that is readily redissolvable, film-forming, free of polymerized saccharide units, and has a water solubility of at least 100 gms/liter, wherein said water-soluble polymer is blended with said aqueous emulsion, and wherein once said concrete curing coating composition is dried, it forms a coherent, water-impermeable membrane.

2. The composition of claim 1, wherein a barrier film formed from the composition complies with ASTM C 309.

3. The composition of claim 2, wherein the water-soluble polymer is non-thickening.

4. The composition of claim 3, wherein the water-soluble polymer is polyvinylpyrrolidone, polyvinyl alcohol, polyacrylic acid, polymethacrylic acid, polyethers, polyethylene glycols, polyacrylamides, polymethacrylamides, polyvinylimidazole, a copolymer containing at least 50 mol % of one or more of N-vinylpyrrolidone, vinyl alcohol, acrylic acid, methacrylic acid, ethers, ethylene glycol, acrylamide and methacrylamide, vinyl imidazole, ethylene or propylene oxide extended and/or ethylene oxide capped, or a mixture of such polymers and copolymers.

5. The composition of claim 4, wherein the hydrophobic membrane-forming polymer is a chlorinated rubber, a styrene copolymer, an acrylic copolymer, a hydrocarbon resin, paraffinic wax, or mixtures thereof.

6. The composition of claim 5, wherein the hydrophobic membrane-forming polymer is a hydrocarbon resin.

7. The composition of claim 4, wherein the water-soluble polymer is a polymer or copolymer of N-vinylpyrrolidone.

8. The composition of claim 7, wherein the water-soluble polymer is polyvinylpyrrolidone.

9. The composition of claim 4, wherein the water-soluble polymer has a molecular weight of about 100,000 to 2,500,000.

10. The composition of claim 9, wherein the water-soluble polymer has a molecular weight of about 150,000 to 2,000,000.

11. An easily removable concrete curing coating composition capable of forming a bather film complying with ASTM C 309, the composition comprising water, a hydrophobic membrane-forming polymer and a water-soluble, film-forming polymer having a water solubility of at least 100 gms/liter.

12. The composition of claim 11, wherein the water-soluble polymer is polyvinylpyrrolidone, polyvinyl alcohol, polyacrylic acid, polymethacrylic acid, polyethers, polyethylene glycols, polyacrylamides, polymethacrylamides, polyvinylimidazole, a copolymer containing at least 50 mol % of one or more of N-vinylpyrrolidone , vinyl alcohol, acrylic acid, methacrylic acid, ethers, ethylene glycol, acrylamide and methacrylamide, vinyl imidazole, ethylene or propylene oxide extended and/or ethylene oxide capped, or a mixture of such polymers and copolymers.

13. The composition of claim 12, wherein the hydrophobic membrane-forming polymer is a chlorinated rubber, a styrene copolymer, an acrylic copolymer, a hydrocarbon resin, paraffinic wax, or mixtures thereof.

14. The composition of claim 13, wherein the hydrophobic membrane-forming polymer is a hydrocarbon resin.

15. The N-vinylpyrrolidone composition of claim 12, wherein the water-soluble polymer is a polymer or copolymer of N-vinylpyrrolidone.

16. The composition of claim 15, wherein the water-soluble polymer is polyvinylpyrrolidone.

17. The composition of claim 12, wherein the water-soluble polymer has a molecular weight of about 100,000 to 2,500,000.

18. A process for forming an easily removable, aqueous based, concrete curing coating composition capable of forming a barrier film complying with ASTM C 309, the process comprising combining a water-soluble, readily redissolvable, film-forming polymer having a water solubility of at least 100 gms/liter and a hydrophobic membrane-forming polymer.

19. The process of claim 18, wherein the hydrophobic membrane-forming polymer is a chlorinated rubber, a styrene copolymer, an acrylic copolymer, a hydrocarbon resin, or mixtures thereof, and further wherein the water-soluble polymer is polyvinylpyrrolidone , polyvinyl alcohol, polyacrylic acid, polymethacrylic acid, polyethers, polyethylene glycols, polyacrylamides, polymethacrylamides, polyvinylimidazole, a copolymer containing at least 50 mol % of one or more of N-vinylpyrrolidone, vinyl alcohol, acrylic acid, methacrylic acid, ethers, ethylene glycol, acrylamide and methacrylamide, vinyl imidazole, ethylene or propylene oxide extended and/or ethylene oxide capped, or a mixture of such polymers and copolymers.

* * * * *